No. 827,015. PATENTED JULY 24, 1906.
J. T. HIER, Jr.
COMPUTING MECHANISM FOR WEIGHING SCALES.
APPLICATION FILED AUG. 18, 1905.
2 SHEETS—SHEET 1.
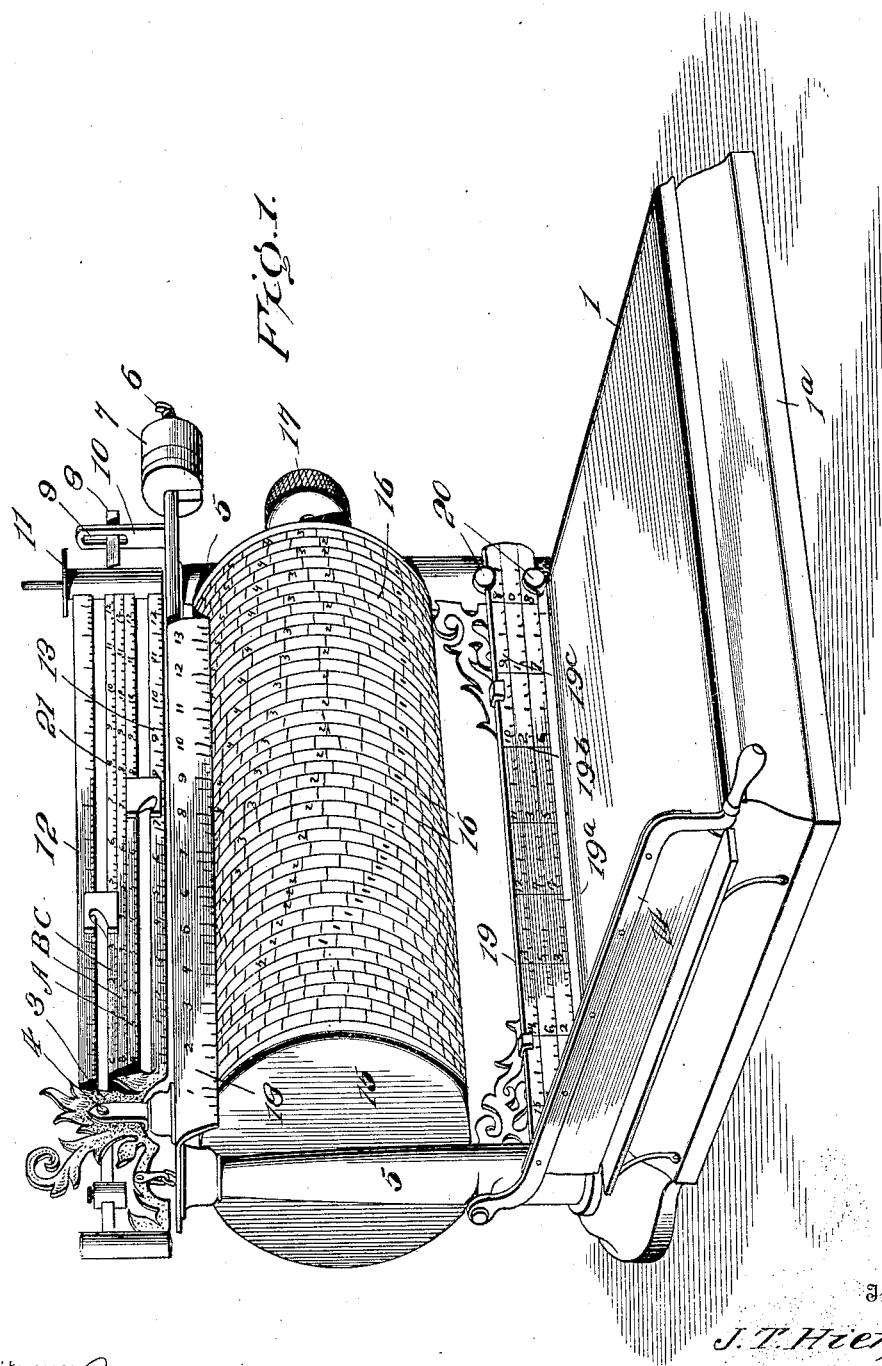
Witnesses
Inventor
J. T. Hier, Jr.
By
Attorneys No. 827,015. PATENTED JULY 24, 1906.
J. T. HIER, JR.
COMPUTING MECHANISM FOR WEIGHING SCALES.
APPLICATION FILED AUG. 18, 1905.
2 SHEETS—SHEET 2.
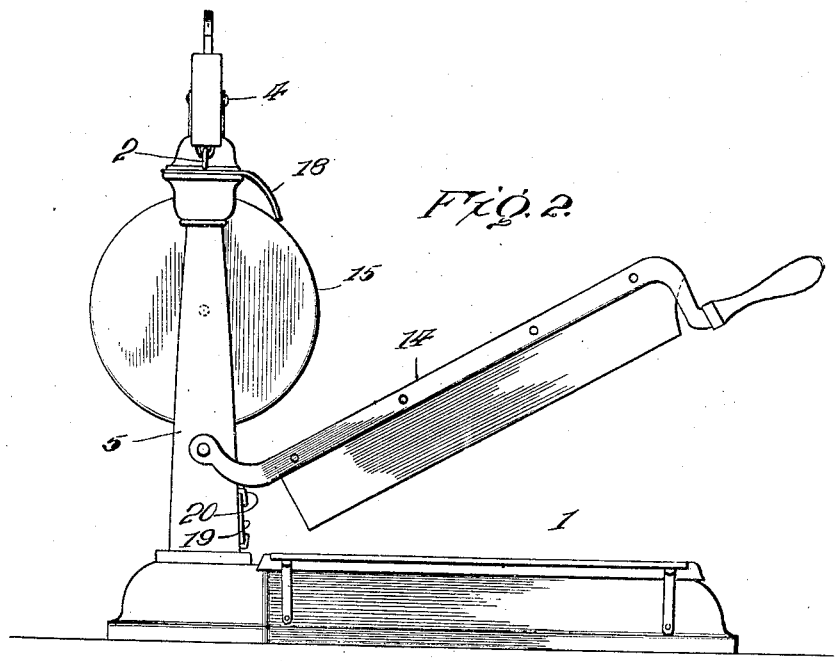
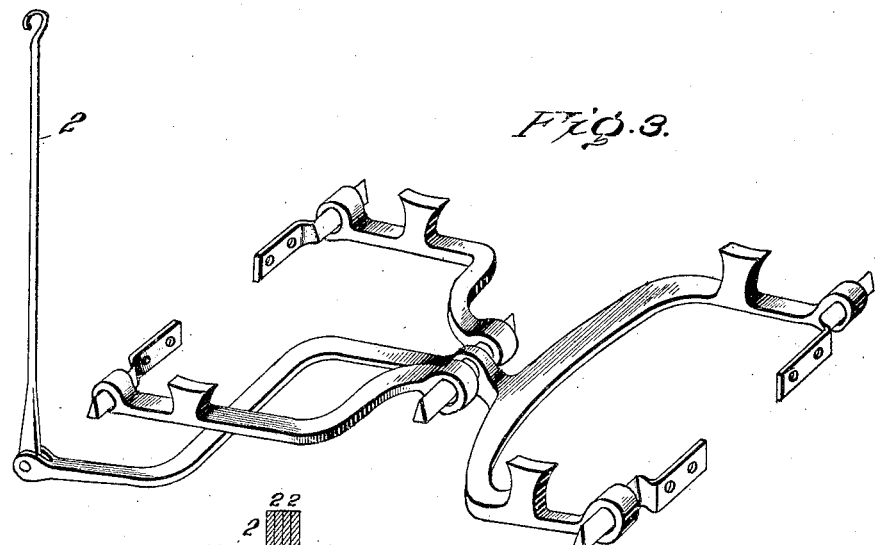
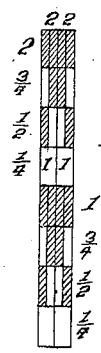
Witnesses
Inventor
J. T. Hier, Jr.
By
Attorneys

UNITED STATES PATENT OFFICE.

JAMES THOMAS HIER, JR., OF MARCELINE, MISSOURI.

COMPUTING MECHANISM FOR WEIGHING-SCALES.

No. 827,015.   Specification of Letters Patent.   Patented July 24, 1906.

Application filed August 18, 1905. Serial No. 274,909.

*To all whom it may concern:*

Be it known that I, JAMES THOMAS HIER, Jr., a citizen of the United States, residing at Marceline, in the county of Linn and State of Missouri, have invented certain new and useful Improvements in Computing Mechanism for Weighing-Scales, of which the following is a specification.

This invention consists, essentially, of special mechanism designed to be applied to weighing-scales, adapted particularly for weighing meats, for the purpose of enabling the user of the scales to ascertain accurately the size of a portion of a piece of meat which should be cut from the bulk of the meat to weigh a certain amount desired by a customer.

As is well known, butchers frequently suffer no small loss due to waste arising from the fact that ordinarily when a customer desires a certain amount of meat the butcher is not able to cut the desired amount, which makes it necessary to reduce a cut portion of meat, the portions cut away in such reduction being usually good as scraps only and forming a waste so far as the actual value of the meat is concerned.

The invention obviates the foregoing by the provision of computing mechanism the details of which will appear fully hereinafter.

For a full description of the invention and the merits thereof and also to acquire a knowledge of the details of construction of the means for effecting the result reference is to be had to the following description and accompanying drawings, in which—

Figure 1 is a perspective view showing the mechanism embodying the invention applied to weighing-scales. Fig. 2 is a side elevation of a machine embodying the invention. Fig. 3 is a perspective view showing the fulcrumed levers which support the weighing-platform. Fig. 4 is an elevation of one of the scales on the computing-roller, showing more clearly the manner of dividing said scales into units and fractions of units of weight and measurement.

Corresponding and like parts are referred to in the following description and indicated in all the views of the drawings by the same reference characters.

Referring to the drawings, the numeral 1 designates a platform of a given type of weighing-scale at present in use, the platform 1 being supported by suitably-fulcrumed levers, which are connected by a rod 2 with a scale-beam 3, fulcrumed at 4 and arranged at the upper portion of the scale. The scales are provided at opposite ends with vertical standards 5, and the beam 3 is suitably supported thereon. One of the standards 5 is formed with a horizontal shelf 6, adapted to carry the weights 7, and a stop 8, projected from the adjacent end portion of the balance-beam 3, moves in a guide-slot 9 on a vertical arm 10, limiting the movement of the balance-beam and facilitating the quick determination of the weight of an article placed upon the weighing-platform 1. A suitable supporting-plate 11, carried by the end portion of the beam 3, adjacent the arm 10, will hold the weights 7 when the latter are placed on the beam in the weighing operation. The beam 3 is provided with an upper scale-bar 12, graduated in weight units of ounces by said indicating-marks. A similar bar 13 at the lower portion of the beam 3 is graduated in two-ounce unit marks, as will be readily noted on reference to the drawings.

The special character of the weighing mechanism is not important within the contemplation of the invention, as it is designed that the computing mechanism comprising the same may be applied to various types of weighing-scales in accomplishing the desired result. For this reason the weighing mechanism is but generally described. Disposed at one end of the platform 1 or the support 1ª thereof and pivotally mounted, preferably, is arranged the cutting-knife 14, said knife being adapted to cut the desired length of the meat after the portion which is to be cut has been accurately determined by measurement thereof. The computing mechanism embodies, primarily, a movable computing device comprising a computing-roller 15, journaled in the standard 5 below the balance-beam 3 before described, said computing-roller being marked off so as to form a plurality of scales 16, the graduations of which extend entirely around the roller.

The scales 16 on the computing-roller are arbitrary in selection in order to secure the best results, and these scales embody graduations of scale-marks divided into parts indicated by numerals consecutively arranged and running from "1" up to a number dependent on the size of the roller. A suitable handle 17 projects from one end of the roller and enables the same to be readily manipulated, so as to turn it in the actual operation of the device. Coöperating with the roller 15 is a computing-bar 18, which is provided with graduations dividing the same into units of measurement and weight. The graduations on the bar 18 are subdivided into fractions of main graduations, and the same is true with reference to the several scales marked 16 on the drawings, which scales are adapted to individually coöperate with the various scale or graduated marks on the computing-bar 18.

Arranged below the computing-roller 15 and extending lengthwise of the platform 1 near one of its longitudinal edges is a measuring-plate 19, said plate being divided into inches and fractions of inches and having a number of sets of scales, (indicated at 19ª, 19ᵇ, and 19ᶜ, respectively.) The plate 19 is supported by means of guide-lugs 20 above and below said plates and projecting from adjacent portions of the scales, on which the computing mechanism is arranged. The lugs 20 permit of a longitudinal sliding movement of the plate 19 to adjust the position of the latter, as will be more fully described hereinafter. The balance-beam 3 supports a longitudinally-arranged scale-plate 21, having a plurality of reduction measuring-scales, (indicated at A, B, and C, respectively.) The scales A, B, and C are designed for measuring a determinate length of meat when the bulk from which a certain portion is to be cut is of unequal thickness, tapering toward an end or being reduced toward one extremity in a similar manner. The provision of the scales A, B, and C on the scale-plate 21 broadens the application of the invention from the standpoint of practical use in that the same is adapted for measuring portions of meats of unequal thickness, as well as the regular run of meats, such as fancy breakfast-bacon and trimmed sides, which are ordinarily regular in thickness.

The description of the actual use of the invention will show the advantages for the various parts hereinbefore described. A piece of meat having been weighed on the scales resting on the platform 1, we will say, weighs eight and five-eighths pounds. Referring to the computing-bar 18, the graduation "8¾" is noted, and the customer desiring four and one-half pounds the roller 15 is revolved until the mark "4½" of one of the scales thereof is under the space between the marks "8¾" and "9" on the bar 18, said bar embodying arbitrary graduations of weights and measures in units of ounces and inches. When the "4½" on the roller comes under the space between "8¾" and "9" on the bar 18 and the bulk of meat on the platform 1 has previously been weighed and measured and noted to be twelve inches long, the operator will now note the mark "12" on the bar 18 and the mark which is just below the mark "12" in a certain scale on the roller 15. The mark below the mark "12" on the bar 18 will be "6," which will represent that the length of a piece of meat weighing four and one-half pounds of the body of meat weighing eight and five-eighths pounds and twelve inches long will be six inches long.

The above is the principle of operation in determining the weight of a desired piece of meat when the meat is a nicely-trimmed side or a regularly-cut piece. The aim is first to weigh the meat on the scales, and after ascertaining the weight of the same and the length of the piece by referring to the scale-plate 19 the weight of the whole piece is referred to on the computing-bar 18 and the roller 15 adjusted so as to bring a designation in the length of one of the scales 16 below the weight-mark on the bar 18, which designation will represent the weight of the piece desired to be cut off for a customer. The above having been done, the operator refers to the mark on the bar 18 indicative of the length of the whole piece of meat, and the mark on the roller just below the last-mentioned mark on the bar 18 will give the length of the piece which must be cut off of the whole piece of meat to represent the desired quantity for the customer.

In some instances certain meats are not of regular shape in bulk, and when the same slope or taper toward an end it is necessary that the length of the meat cut off from the whole body of meat on the scales shall be computed with reference to the degree of slope or taper. For this reason the scale-plate 21 on the beam 3, which is provided on the measuring reduction-scales, is used. The scales A, B, and C are adapted to measure in inches and fractions of inches, being regularly graduated so that each inch is reduced in a proportion necessary to secure the proper length of meat cut from regularly-shaped meats in bulk. For instance, the scale A of the series A, B, and C is graduated so that each inch-mark really represents fifteen-sixteenths of an inch, the scale-beam being divided into inch-marks representing accurately when in B series seven-eighths of an inch, while the scale C is similarly graduated, representing only three-fourths of an inch so far as the units of graduation are concerned, each of the scales A, B, and C being shortened so far as the length of its unit is concerned to allow for the increase in thickness of meats in the regular size weighed by means of the scales. Thus in weighing a piece of meat of a regular thickness it is noted that the piece weighs eight pounds and is twelve inches long. Four pounds of the meat is wanted by a customer, so the roller 15 is turned until the numeral "4" of the scale 15 comes under the space between "7¾" and "8" on the computing-bar 18. Looking under the numeral "12" on the bar 18 to the roller 15 is noted that the figure "6" is under the numeral "12" of said bar, indicating six inches of the meat to represent four pounds.

However, as the piece of meat is irregular in shape and comes under the reduction-scale B there would be one-eighth of an inch off to each pound, so that under scale B four pounds of the meat of regular thickness being weighed will represent a length of five and one-half inches due to its reduction of thickness.

The use of the measuring-plate 19 is peculiar, and it will be noted that the scale-graduation 9$^a$ begins with the numeral "1" and runs in units of inches and fractions thereof up to "18" leading from the left to the right. The plate 19 is just as long as the platform 1— say in this instance eighteen inches—and therefore said plate is capable of measuring thirty-six inches, because it slides either way, either to the right or left. The right end of the measuring-plate is always flush with the right end of the meat. When the meat is longer than eighteen inches or the length of the platform or the platform is shorter than eighteen inches, the length of the meat is found by noting the scale 19$^a$, the figures running from the left to the right. To secure the length of the whole piece of meat when it is desired to cut off a certain number of inches, the measuring-plate is slid to the right until the right end thereof is even or flush with the right end of the meat, and then the knife is raised and the meat is pushed until the right end of said meat comes even with the number of inches on the measuring-plate, beginning at "1" in the scale 19$^b$ and running from the right to the left. It is always necessary to get the measurement when you want to get the amount to be cut off from the bulk of the meat from the rear end.

Having thus described the invention, what is claimed as new is—

In means of the class described, the combination of weighing mechanism including a scale-beam having a plurality of reduction-scales graduated in units of weight and measure, and a computing-roller and computing-bar arranged adjacent the scale-beam, the roller embodying a plurality of scales graduated in units of weight and measure, the computing-bar having a plurality of graduations in units of weight and measure and arranged to coact with those on the roller.

In testimony whereof I affix my signature in presence of two witnesses.

JAMES THOMAS HIER, JR. [L. S.]

Witnesses:
LOUISE T. GUCKER,
NOBLE H. ROE.